Jan. 13, 1925.

W. F. McDERMID 1,522,895

BRAKE SYSTEM AND APPARATUS FOR RAILWAY VEHICLES AND THE LIKE

Filed Sept. 12, 1923      3 Sheets-Sheet 1

Inventor
Wm. F. McDermid
by Herbert W. P. Jenner,
Attorney.

Jan. 13, 1925.                                              1,522,895
W. F. McDERMID
BRAKE SYSTEM AND APPARATUS FOR RAILWAY VEHICLES AND THE LIKE
Filed Sept. 12, 1923    3 Sheets-Sheet 2

Inventor,
Wm. F. McDermid
by Herbert W. Penner
Attorney.

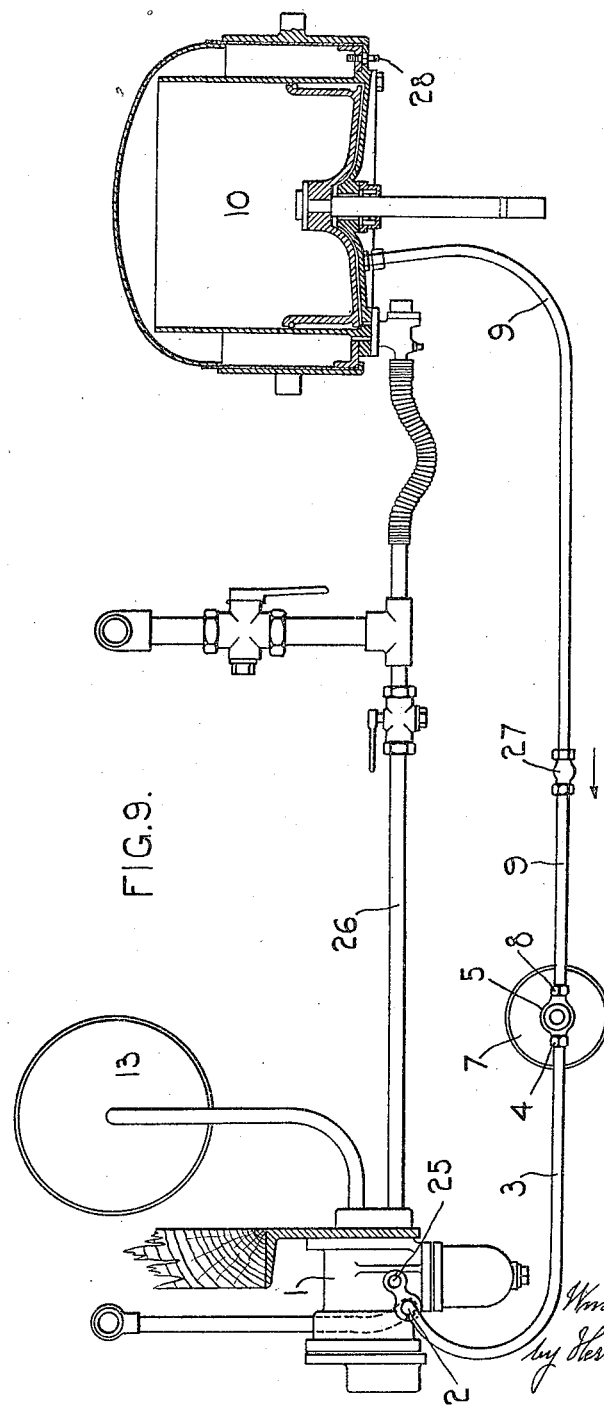

Patented Jan. 13, 1925.

1,522,895

UNITED STATES PATENT OFFICE.

WILLIAM FRANCIS McDERMID, OF SOUTH WOODFORD, ENGLAND.

BRAKE SYSTEM AND APPARATUS FOR RAILWAY VEHICLES AND THE LIKE.

Application filed September 12, 1922. Serial No. 662,210.

*To all whom it may concern:*

Be it known that I, WILLIAM FRANCIS McDERMID, a subject of the King of Great Britain, residing at South Woodford, Essex, England, whose post-office address is 13 Cleveland Road, South Woodford, in the county of Essex, England, have invented certain new and useful Improvements in and Relating to Brake Systems and Apparatus for Railway Vehicles and the like; and I do hereby declare the following to be a full, clear, and exact description of the invention, such as will enable others skilled in the art to which it appertains to make and use the same.

This invention has for its object improvements in and relating to brake systems and apparatus for railway vehicles and the like, in which the brakes are applied to the vehicles of a train by fluid under pressure (usually compressed air) admitted to the brake cylinders on the vehicles. With such systems when the brake piston is moved within the brake cylinder the piston moves or sweeps through a certain volume or space, which may be considered as having been in a state of perfect vacuum, and before there can be any effective pressure on the piston at the end of its stroke the said volume or space must first be filled with air at atmospheric pressure or thereabouts which must thereafter rise to the higher pressure requisite for applying the brakes. It therefore follows that for producing this idle or ineffective stroke of the piston, by which the brake blocks are simply moved into contact with the vehicle wheels without any effective braking pressure thereon, a certain amount of compressed air from the supply reservoir is dissipated.

When the conditions are such that the effective pressure desired within the brake cylinder is a low one, for instance only two or three pounds to the square inch above the pressure of the atmosphere, by far the greatest part of the total amount of air which must be passed into the brake-cylinder, will go to bring the pressure up to that of the atmosphere; and it is one of the objects of the present invention to limit consumption of compressed air from the ordinary supply reservoir for moving the piston from its normal or "running" (brakes off) position to the end of its stroke when moving the brake blocks into contact with the wheels so that the effective pressures on the brake pistons may be more evenly balanced than at present, by elimination or reduction of the effects of differences of piston travel in the several brake cylinders.

In a brake system embodying the invention the air for moving the piston of the brake cylinder from its normal or "running" (brakes off) position to the ends of its stroke in which the brake blocks are in contact with the wheels, is entirely or in part supplied from a sub-auxiliary reservoir. The ordinary Westinghouse triple valve is, as usual modified by the provision of an additional air passage so controlled by the triple valve slide valve that in the "running" (brakes off) position the additional air passage is in communication with the air supply or storage reservoir through a small port in the valve, and in the "brakes on" position the said additional air passage is placed in communication with the brake cylinder. The invention is characterized by the association with the sub-auxiliary reservoir of a pressure control valve adapted to control the supply of air from the auxiliary reservoir through the triple valve to the sub-auxiliary reservoir and from the sub-auxiliary reservoir to the brake cylinder. When the triple valve is in any position other than full release, air stored in the sub-auxiliary reservoir associated with the control valve, is admitted through the triple valve ports into the brake cylinder until the pressure therein, by reacting on the control valve, stops the flow.

Fig. 1 of the accompanying illustrative drawings shows in sectional elevation sufficient of an ordinary Westinghouse triple valve to indicate the modification necessary.

Fig. 9 illustrates a brake installation embodying the invention.

Figure 1:
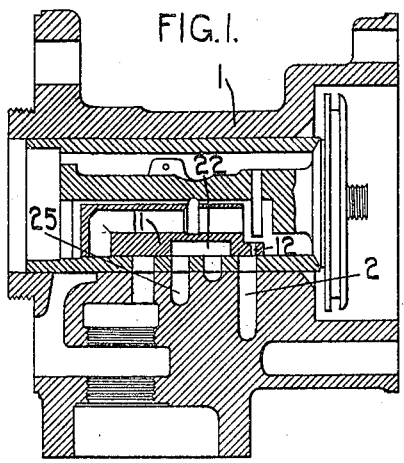
Figure 2:
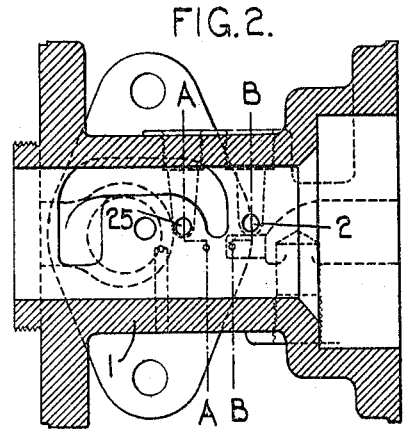
Fig. 2 shows in central horizontal section the casing of the triple valve.
Figure 3:
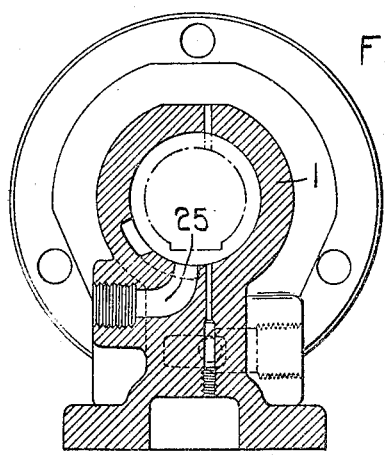
Figs. 3 and 4 are vertical transverse sections of the triple valve casing corresponding to the lines A A and B B respectively of Fig. 2.
Figure 5:
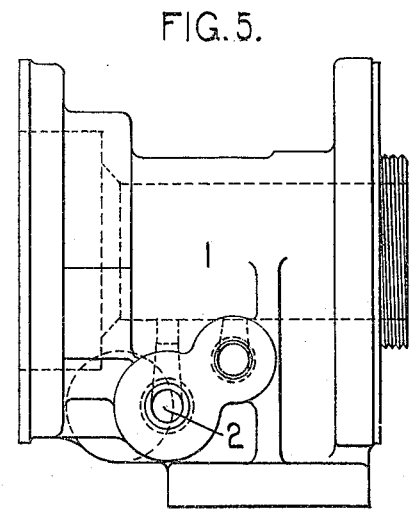
Fig. 5 shows the triple valve casing in side elevation.
Figure 4:
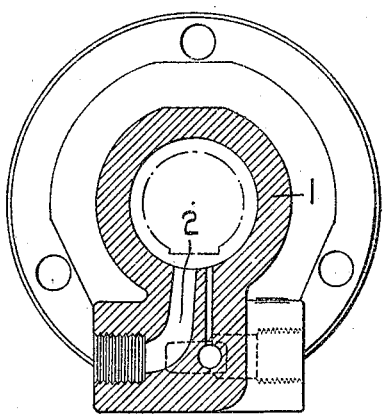
Figure 6:
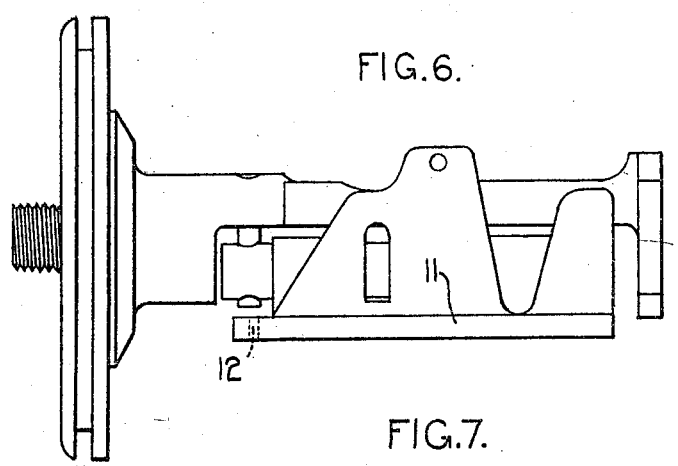
Fig. 6 shows the valves of the triple valve in side elevation.
Figure 7:
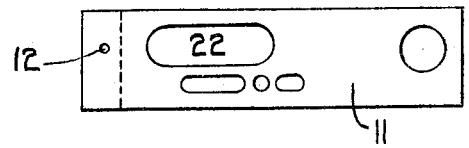
Fig. 7 is an underside view of the triple valve slide valve.
Figure 8:
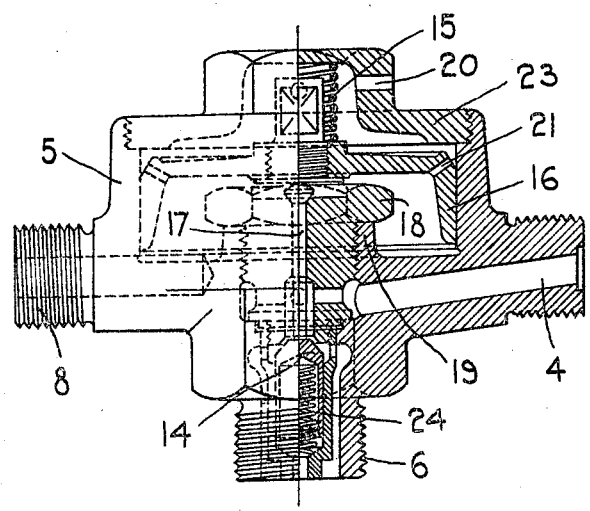
Fig. 8 shows partly in side elevation and partly in vertical central section, a pressure control valve adapted to be associated as hereinafter described with the sub-auxiliary reservoir.

The triple valve 1 is of the ordinary Westinghouse construction except that it is formed with an additional air passage 2 adapted to be connected by a pipe 3 to a branch 4, Figs. 8 and 9, of a pressure control valve 5 that is connected by a branch 6 with a sub-auxiliary reservoir 7. Through another branch 8 and a pipe 9, the pressure control valve 5 is connected to the brake cylinder 10.

The additional air passage 2 of the triple valve is controlled by the triple valve slide valve 11 which is formed with a small port 12 which places the additional air passage 2 in free communication with the air supply or auxiliary reservoir 13 when the triple valve is in the "brakes off" or running position.

Referring to Fig. 8, it will be seen that the pressure control valve 5 comprises a casing provided with the three branches 4, 6 and 8, the branch 4 for connection to the said additional air passage 2 through the pipe 3, the branch 8 for connection with the brake cylinder 10 through the pipe 9, and the branch 6 in communication with the sub-auxiliary air reservoir 7. Between the passage of the branch 4 connected to the triple valve and the passage of the branch 6 connected to the sub-auxiliary air reservoir 7 is a valve 14 which in the normal "brakes off" position is maintained open by a spring 15 which is located above a piston-valve 16 arranged to work in the upper part of the valve casing 5, the spring 15 exerting pressure upon the valve 14 in order to keep it open, through the said piston valve 16 and a stem 17 which works through an axial boring formed therefor in a gland nut 18 screwed into a partition wall 19 that divides the piston valve side of said valve casing from the part thereof from which the branches 4 and 6 extend. On one side of the piston valve 16 the valve casing 5 is in free communication with the atmosphere through a suitable opening 20 and the piston valve 16 is formed with leak ports 21 whereby compressed air at the other side thereof coming from the brake cylinder 10 through the branch 8 in connection therewith, can slowly escape to the atmosphere in the same way that it can escape through the well known leakage groove provided in the Westinghouse brake cylinders.

The construction and arrangement are such that normally in the "running" (brakes off) position the valve 14 is open and compressed air from the tripe valve casing 1 passes into the sub-auxiliary reservoir 7. Upon an application of the brakes air from the sub-auxiliary reservoir 7 can pass through a channel, for instance the exhaust cavity 22, in the triple valve slide valve 11 to the brake cylinder in order to move the piston thereof to the end of its stroke for moving the brake blocks into contact with the wheels. When the brake blocks are on, compressed air flows from the brake cylinder and acts on the piston valve 16 of the pressure control valve and moves it on to a seating formed on the cover 23 which closes communication with the atmosphere through the port 20 whereupon, under the pressure of a spring 24 arranged below the valve 14, the said valve 14 controlling the supply of air to or from the sub-auxiliary reservoir 7 closes and any further pressure of air required in the brake cylinder must come from the ordinary supply reservoir 13. Upon normal "brakes off" position again occurring the parts of the pressure control valve again assume their normal position, the compressed air below the piston 16 having escaped back into the brake cylinder and from there to the atmosphere through the triple valve exhaust port 25 in the ordinary way.

The leak ports 21 in the piston valve 16 serve as additional exhaust ports to the atmosphere when the piston-valve moves under the influence of its spring 15. This movement again opens the valve 14 controlling the supply of air to or from the sub-auxiliary reservoir 7, but, owing to the position of the triple valve, its communication with the brake cylinder is closed.

The brake installation shown in Fig. 9 in which the present improvements are embodied is of the kind described in the specification of a patent granted to me and others, in Great Britain, numbered 190,518, relating to brake apparatus adapted to operate upon either the Westinghouse or pressure system or upon the vacuum system, but as will be understood the invention is applicable to ordinary Westinghouse brake installations, the pipe 9 from the pressure control valve 5 being in that case connected directly to the pipe 26 shown in Fig. 9 as connecting the triple valve to the vacuum brake cylinder 10. 27, Fig. 9, indicates a non-return valve fitted in the pipe 9, and 28 indicates a small valve fitted in the reservoir side of the vacuum brake cylinder adapted to allow air to freely pass from the cylinder reservoir to the atmosphere, the said valve acting to prevent atmospheric air entering the cylinder reservoir when the same is used under the vacuum brake system but allowing air to gently enter the same when the said brake cylinder is being used under the Westinghouse air pressure system as described in the said British specification.

It will be understood that I do not limit myself to the details of construction and arrangement of the parts of the apparatus as before described as different constructions and arrangements might be adopted without departure from the invention which consists in the provision of a sub-auxiliary air reservoir associated with a pressure control valve whereby air therefrom is employed for moving the piston of the brake cylinder from its normal or "running" (brakes off) position to the position it must occupy in order to bring the brake blocks into contact with the wheels.

What I claim is:—

1. A brake system comprising a sub-auxiliary reservoir, and a pressure control valve whereby the air for moving the piston of the brake cylinder from its normal or "running" (brakes off) position to the end of its stroke in which the brake blocks are in contact with the wheels, is entirely or in part supplied from the said sub-auxiliary reservoir until the pressure in the brake cylinder by reacting on the control valve stops the flow of air from the said sub-auxiliary reservoir, said pressure control valve comprising a casing provided with three branches namely one connected to a special air passage provided therefor in the triple valve, another in connection with the brake cylinder, and the third in communication with the sub-auxiliary air reservoir, a valve in said casing controlling communication between the branch connected to the sub-auxiliary reservoir and the branch connected to the triple valve, a spring tending to keep the said valve closed, a piston valve in said casing subjected on the one side to the pressure of the air that enters said casing through the branch thereof in connection with the brake cylinder, a hole in said casing placing the space at the other side of said piston valve in communication with the atmosphere, a spring in said casing tending to move said piston valve in a direction opposite to that in which it is moved by the air entering the casing through the branch in connection with the brake cylinder, a member between said piston valve and said first mentioned valve whereby the movement of said piston valve by its spring effects a movement of the said first mentioned valve to open the same against the action of its spring, and a leak port through said piston valve whereby pressure air at the one side thereof can slowly escape to the other side and thence to the atmosphere when said piston valve is moved by its spring in a direction to open said first mentioned valve.

2. In a fluid pressure brake, the combination, with a brake cylinder, an auxiliary reservoir, and a sub-auxiliary reservoir, of means operating in a service application of the brakes to supply pressure fluid from the sub-auxiliary reservoir to the brake cylinder simultaneously with the admission thereto of pressure fluid from the said auxiliary reservoir, and operating thereafter when the application of the brakes is complete to cut off the supply of fluid automatically from the sub-auxiliary reservoir, without cutting off the supply of fluid from the auxiliary reservoir to the brake cylinder.

3. In a fluid pressure brake, the combination, with a brake cylinder, an auxiliary reservoir, and a sub-auxiliary reservoir of means operating in a service application of the brakes to admit fluid under pressure to the brake cylinder from the two said reservoirs simultaneously, and operating thereafter to cut off the supply of fluid automatically from the sub-auxiliary reservoir to the brake cylinder, and thereafter permitting the supply of additional pressure fluid from the auxiliary reservoir to the brake cylinder to be increased and diminished at will and independently of the sub-auxiliary reservoir.

In testimony whereof I affix my signature.

WILLIAM FRANCIS McDERMID.